(12) United States Patent
Obersteiner

(10) Patent No.: US 7,681,815 B2
(45) Date of Patent: Mar. 23, 2010

(54) DEVICE FOR CHOPPING FOOD, IN PARTICULAR PIECES OF ICE

(75) Inventor: Heimo Obersteiner, Klagenfurt (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/090,966

(22) PCT Filed: Oct. 10, 2006

(86) PCT No.: PCT/IB2006/053714

§ 371 (c)(1),
(2), (4) Date: Apr. 21, 2008

(87) PCT Pub. No.: WO2007/046029

PCT Pub. Date: Apr. 26, 2007

(65) Prior Publication Data

US 2008/0223965 A1    Sep. 18, 2008

(30) Foreign Application Priority Data

Oct. 19, 2005    (EP) .................................. 05109747

(51) Int. Cl.
*B02C 9/04* (2006.01)
*B02C 4/18* (2006.01)

(52) U.S. Cl. ...................................... 241/73; 241/282.1

(58) Field of Classification Search .................... 241/73, 241/74, 101.8, 282.1, 282.2, 292.1
See application file for complete search history.

(56) References Cited

U.S. PATENT DOCUMENTS

| 3,313,332 | A  | * | 4/1967  | Otto et al. ...................... 241/98 |
| 6,666,574 | B1 |   | 12/2003 | Pryor |
| 6,676,051 | B2 | * | 1/2004  | Rebordosa et al. ............ 241/73 |
| 2001/0008258 | A1 | * | 7/2001  | Rebordosa et al. ............ 241/69 |
| 2002/0139884 | A1 |   | 10/2002 | Williams |
| 2003/0034409 | A1 |   | 2/2003  | Wong |
| 2005/0068846 | A1 |   | 3/2005  | Wulf |

FOREIGN PATENT DOCUMENTS

| DE | 19737130 | 3/1999 |
| EP | 1127526  | 8/2001 |
| FR | 1265043  | 6/1961 |

* cited by examiner

*Primary Examiner*—Faye Francis

(57) ABSTRACT

A device for chopping food, including ice, has a container with a bearing pin on its bottom. The container is divided into an upper processing zone and a lower collecting zone. For reducing the food, the processing zone accommodates a chopping tool formed by a rotary cutting blade and a tool spindle. A sieve separates the processing zone from the collecting zone. The lower end of the tool spindle is rotatably mounted on the bearing pin. A stirring tool (34) may be provided which is part of the chopping tool and is formed by a rotary stirring blade.

16 Claims, 5 Drawing Sheets

DEVICE FOR CHOPPING FOOD, IN PARTICULAR PIECES OF ICE

The present invention relates to a device for chopping food, in particular pieces of ice, said device including a container providing a bearing pin on its bottom and being divided into an upper processing zone and a lower collecting zone, said processing zone accommodating a chopping tool for reducing the food, said chopping tool being formed by a rotary cutting blade and comprising a tool spindle, and in the transition region from the processing zone to the collecting zone there being at least partially a sieve separating the processing zone from the collecting zone.

Usually, the processing of food by e.g. kitchen appliances is based on a rotational movement of a tool. By rotating for example a blade, or a set of blades, or a disk with a set of blades, food is chopped, cut, grated, mixed, blended etc. To efficiently chop very hard food like nuts, spices, ice cubes or very hard vegetables or fruits, one can improve the tool by optimizing the number, geometry and sharpness of the blades. One can increase the speed of rotation. Or one can increase the time the food to be chopped is processed and continuously separate the readily chopped food from the food still to be chopped further.

A device for chopping food, e.g. ice cubes, nuts, vegetables, and making use of the last possibility is described in EP 1 127 526 B1. The device's container body is divided into an upper processing one and a lower collecting zone. The processing zone accommodates a chopping tool for reducing the food. The chopping tool is formed by rotary blade. In the transition region between the processing zone and the collecting zone a sieve separates both zones. The chopping tool comprises a tool spindle having its lower end rotatably mounted on a bearing pin provided on the bottom of the sieve. Due to the sieve separating the processing zone form the collecting zone, the chopping tool processes every piece of food until it is small enough to fall through the sieve's openings.

Unfortunately, the fact of having to provide a bearing pin on the bottom of the sieve restricts the possibilities of the design of the sieve to sieves with a massive bottom and of stiff material for sustaining the bearing pin even at higher rotational speed and to resist even in case of torque or shear forces acting on the bearing pin due to quite large and hard pieces not easily processed. This makes the sieve quite complex and the production of the chopping device complicated and costly.

It is thus an object of the present invention to provide a device for chopping food having a sieve to separate a processing zone from a collecting zone, but being simple to produce.

This object is achieved by a device for chopping food, in particular pieces of ice, said device including a container providing a bearing pin on its bottom and being divided into an upper processing zone and a lower collecting zone, said processing zone accommodating a chopping tool for reducing the food, said chopping tool being formed by a rotary cutting blade and comprising a tool spindle, and in the transition region from the processing zone to the collecting zone there being at least partially a sieve separating the processing zone from the collecting zone, wherein the lower end of the tool spindle is rotatably mounted on the bearing pin.

By providing the bearing pin in the bottom of the container, one is free to design the sieve predominantly in view of optimizing the shape and the openings for the desired chopping result, be it of chopped nuts or spices, crushed ice or chopped fruit or vegetables. Especially, the choice of material is less restricted, as lesser forces have to be resisted and no bearing pin has to be sustained. The volume of necessary material can be reduced, too.

Besides, providing the bearing pin in the bottom of the container allows to use containers as already provided for kitchen appliances chopping and blending food with rotary chopping blades slightly over the bottom of a container and born by a bearing pin provided in the container's bottom. It is possible as well to optimally integrate the new accessory comprising the sieve and the chopping tool to modular kitchen appliances providing inter alia accessory for conventional blending and chopping.

The chopping tool may be driven by a driving tool coupled to its upper end or by a driving tool integrated in the bottom of the container and coupled to the chopping tool via the bearing pin. The driving tool may be part of the chopping device or an external driving unit, such as a hand mixer or others.

The sieve may be attached to the chopping tool, but preferably it has an opening in its bottom to accommodate the tool spindle. For cleaning and mounting the chopping accessory comprising sieve and chopping tool, it is preferable to have sieve and chopping tool as separate parts.

In preferred embodiments of the present invention, the lower end of the tool spindle has an elongated cavity for rotatably engaging with the bearing pin and allowing for pivotal movement about the axis of the bearing pin. This has shown to be important to fulfill security requirements concerning the actual stopping of the rotational movement of the chopping tool, when the driving unit is switched off or removed and/or some lid to be placed on the container opening against splashing is removed. By allowing a pivotal movement of the chopping tool, one can make sure that the rotational movement of the chopping blades is stopped within a few seconds, thus reducing the risk of the operating person of getting injured by the blades.

In particular for devices operating at quite high rotational speeds, the elongated cavity is preferably provided with a bearing part, the bearing part having a predetermined shape on its inner surface for jamming with the bearing pin during pivotal movement. The process of jamming the tool spindle against the bearing pin allows for a very quick stopping of the tool spindle's rotary movement.

Advantageously, the sieve is removably attached to the opening rim of the container by a ring of elastic material. The connection between the container and the sieve being made of elastic material increases torque resistance and acts as a shock absorber against forces acting on the sieve during chopping and otherwise transmitted to the container. Besides, attaching the sieve to the opening rim of the container by a ring of elastic material reduces the noise during chopping. The ring may be designed to accommodate a lid for closing the container during chopping. A further possibility to increase torque resistance of the sieve is to design it to engage in a form closure with the container opening.

Preferably, the bearing pin is made of metal. This allows for a long lifetime of the device, even if operating at high rotational speeds, as metal has shown to be more wear resistant and temperature resistant than most polymer materials.

In preferred embodiments of the present invention, the device comprises a stirring tool in the collecting zone. This is especially useful, when crushing ice. By adding some juice, or other beverage, or fruit puree, or ice-cream to the collecting zone, the crushed ice and the juice or else are blended to some ice drink like e.g. a smoothie. But also when chopping nuts, spices, fruit or vegetables, the stirring function is useful for preparing sauces, salsas, curry spice mixtures etc.

Preferably for simple mounting, the stirring tool is part of the chopping tool. For example, stirring means may be attached to the spindle of the chopping tool. Or the tool spindle may be divided in separate parts, with one part comprising the rotary chopping blade and with one part comprising stirring means and being mountable on the bearing pin. In this way, the latter part of the tool spindle may be exchanged with a tool spindle part without stirring means, thus enhancing the modular character and multi-functionality of the chopping device according to the present invention.

Advantageously, the stirring tool is formed by a rotary stirring blade. In contrast to a chopping blade, a stirring blade is basically oriented with its surface vertical to the rotary plane for efficiently stirring by displacing larger volumes of the good to be stirred during rotation.

A detailed description of the invention is provided below. Said description is provided by way of a non-limiting example to be read with reference to the attached drawings in which.

Figure 3A:
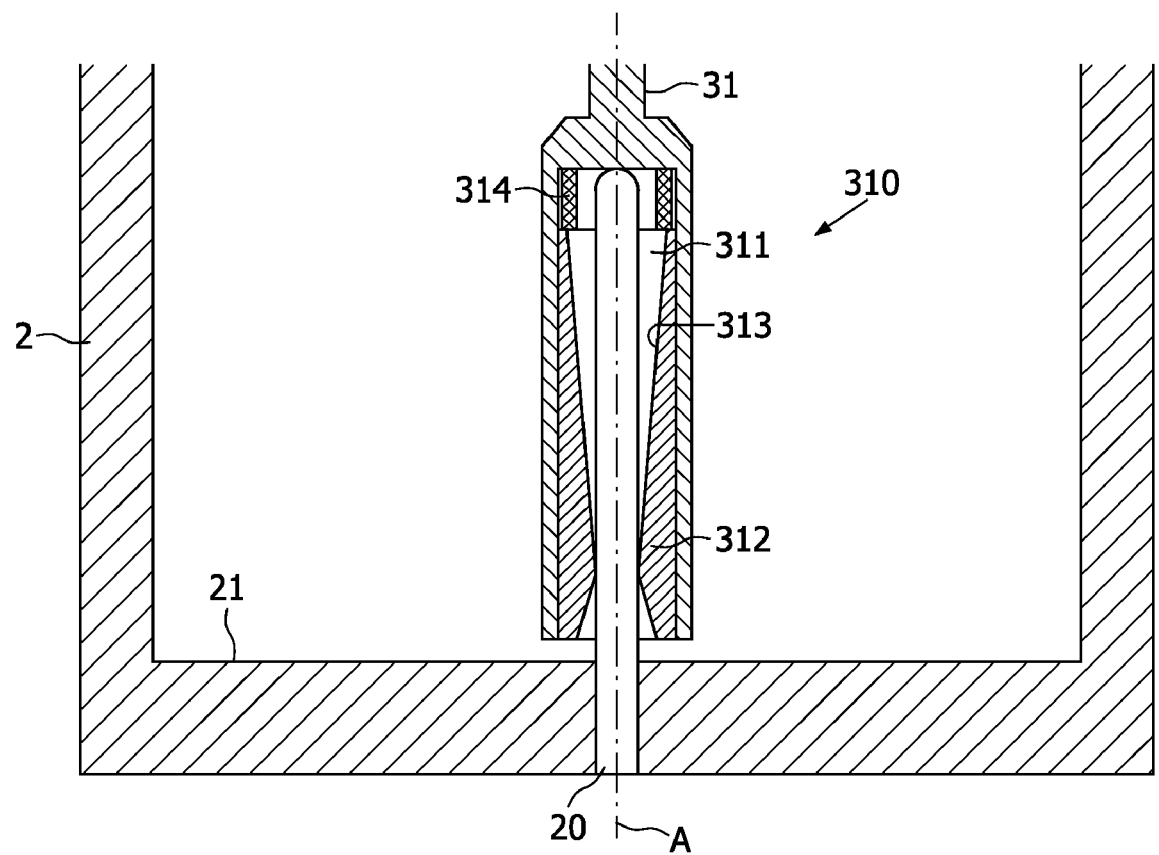
Figure 4:
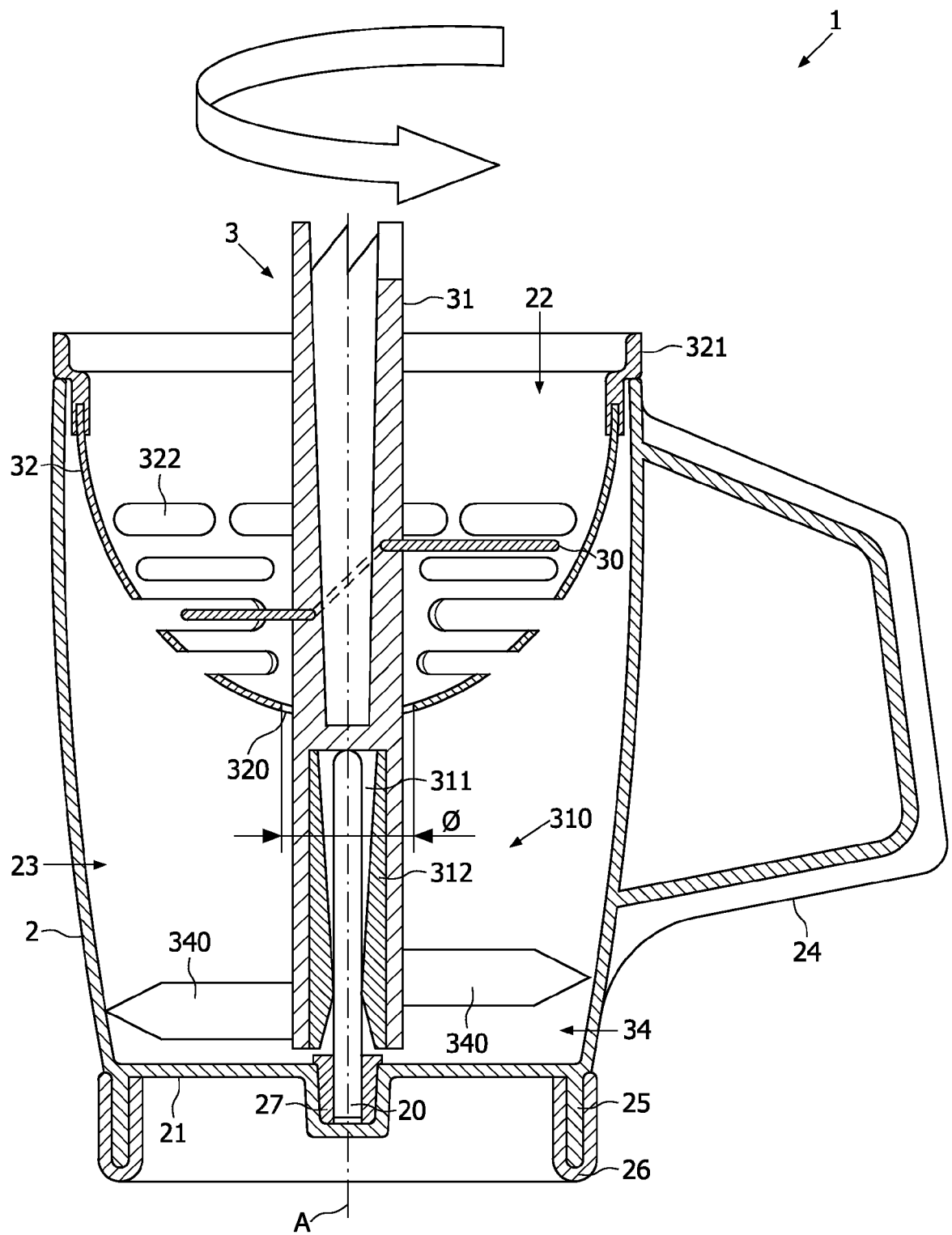

FIGS. 3a,b show in detail the lower end of the tool spindle of a third embodiment of the device according to the present invention; and FIG. 4 shows a cut view of a fourth embodiment of the device according to the present invention.

The present invention will be described further in detail taking the example of an ice crusher 1. The ice crusher 1 comprises a container 2 and a crushing tool 3 with rotary crushing blades 30 and a sieve 32.

The container 2 has a handle 24 and stands on a full perimeter bottom ring 25 with a rubber sheath 26 to prevent slipping of the container 2. In the bottom 21 of the container 2, an anchor device 27 is integrated for fixing the bearing pin 20. In the present example, the bearing pin 20 is made of steel, as is the anchor device 27, whereas the container 2 is made of plastic material.

The rim of the container's opening supports a ring 321 of rubber. This ring 321 holds the sieve 32. The rubber ring 321 improves the torque resistance of the ice crusher 1 and reduces the noise during ice crushing, as the sieve 32 will not flap against the container wall. In the particular example illustrated in FIG. 1, the ring 321 is further necessary, because the sieve is a part of the ice crusher 1 separate from the crushing tool 3. The sieve 32 is held only by the ring 321. If one wants to omit the ring 321, one should design the sieve 32 to engage in a form closure with opening of the container 2.

Figure 1:
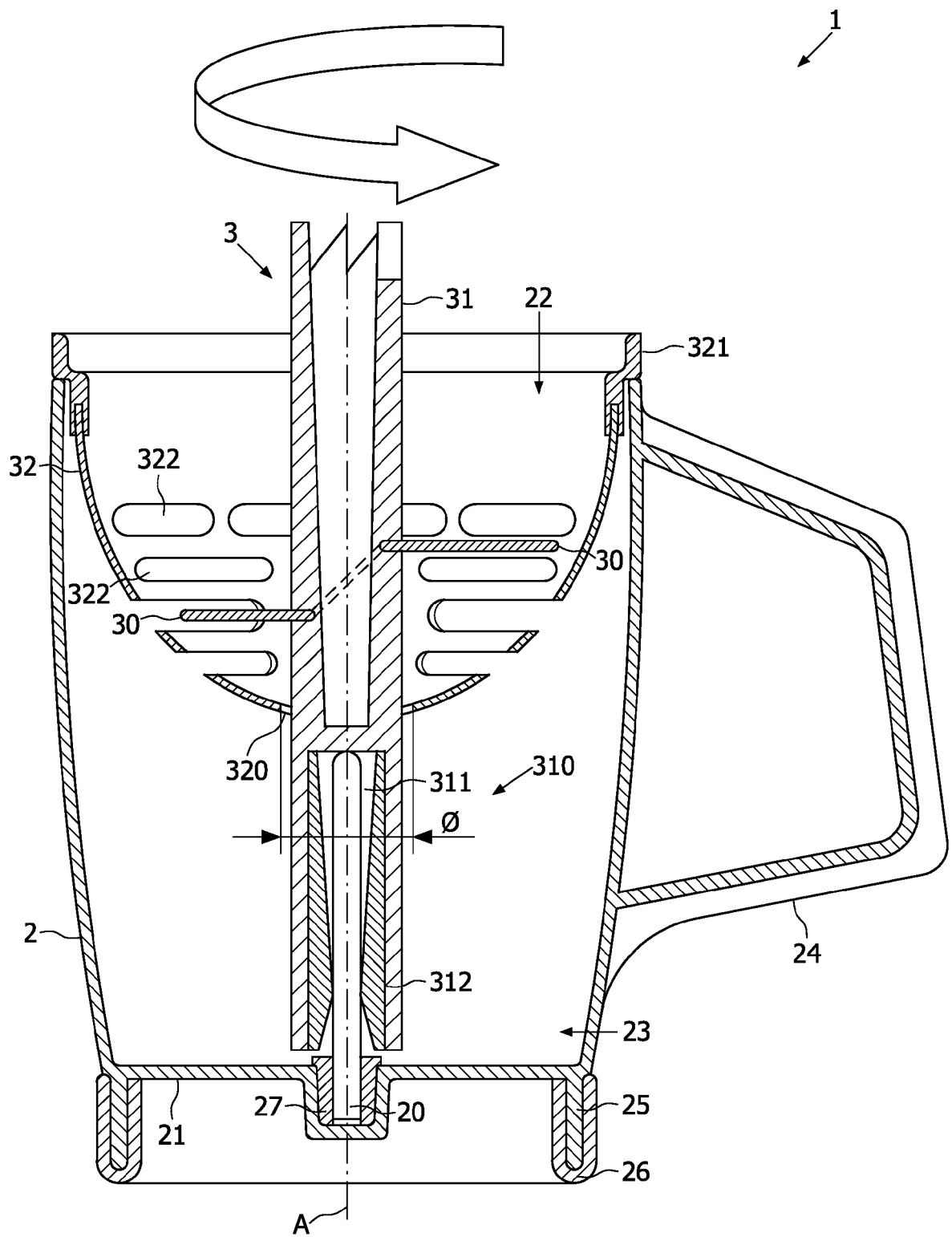
FIG. 1 shows a cut view of a first embodiment of the device according to the present invention.

The sieve 32 of the ice crusher 1 shown in FIG. 1 is made of metal. It has openings 322, the geometry of which is optimized for pieces of crushed ice of a certain size. In the center of its bottom, the sieve 32 has a central opening 320 for accommodating the tool spindle 31 of the crushing tool 3. It will be noted that the diameter ø of the opening 320 is larger than the diameter of the tool spindle 31 at the corresponding height. This allowance is not only to allow for an unhindered rotation of the crushing tool 3, but also to allow for a pivotal movement, as will be explained further in detail below.

The sieve 32 separates the processing zone 22 inside the sieve 32 from the collecting zone below the sieve 32 in the container 2. The sieve 32 may be of any shape adapted to the kind of food to be chopped. Besides being of metal, it can also be of plastic material. Instead of having a surface with openings 322 for the chopped food to fall through into the collecting zone 23, it could also, for example, be made of wire grating. The sieve 32 could be attached to tool spindle 31 of the crushing tool 3, too. But preferably, one would attach it in a way that it does not follow the rotational movement of the crushing tool 3 for better crushing efficiency.

Without the requirement of providing a bearing pin, the design of the sieve 332 is more flexible and can more easily be adapted for optimal chopping, while allowing for less and eventually less expensive material and for reduced production cost.

The crushing tool 3 comprises a tool spindle 31 extending from the bottom 21 of the container 2 to outside the container opening. It has a coupling part at its upper end (not shown) for coupling with some drive unit (not shown). The drive unit can be, e.g. the drive unit of a multifunctional food-processing appliance, or the drive unit of a hand mixer, or a dedicated ice crusher drive unit.

At the height of the processing zone 22, the crushing tool 3 comprises crushing blades 30. The crushing blades 30 are oriented with the surface basically in the rotational plane, for efficiently penetrating and splitting the ice cubes. The geometry of the blades 30 will advantageously be adapted in function of what to chop or crush, e.g. onions instead of ice.

During crushing, any piece of ice small enough to pass through one of the openings 322, falls through the sieve 32 into the collecting zone 23. The other pieces of ice are further processed in the processing zone 22 inside the sieve 32 until they are completely crushed.

The lower end 310 of the tool spindle 31 is rotatably mounted on the bearing pin 20 in the container bottom 21. To allow for rotatably mounting on the bearing pin 20, the lower end 310 of the tool spindle 31 comprises an elongated cavity 311, the length of which is adapted to the length of the bearing pin 20, and inside the elongated cavity 311 there is a bearing part 312. The considerable length of the tool spindle 31 allows for a more stable rotation compared with tools with shorter spindles. Besides, it reduces the risk of the chopping tool 3 being ejected in case or a sudden stop of the rotation, in particular compared to device with a chopping tool mounted on a bearing pin in the bottom of the sieve.

Figure 2:
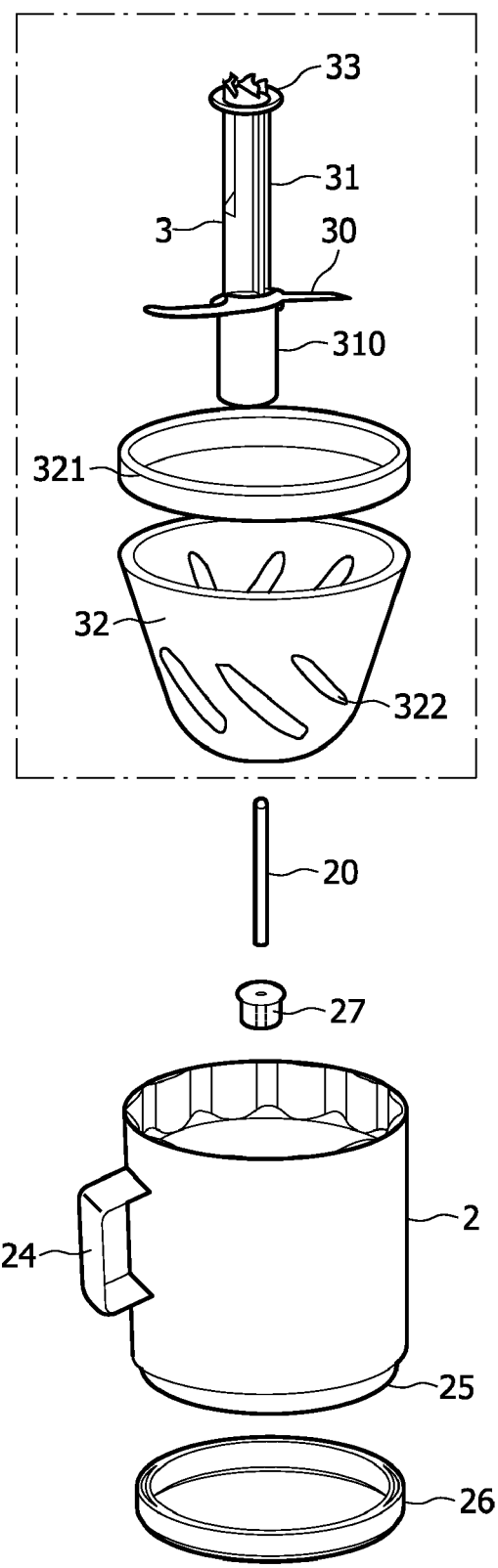
FIG. 2 shows an exploded view of a second embodiment of the device according to the present invention.

FIG. 2 shows an exploded view of a slightly different ice crusher. When putting together the ice-crushing accessory, i.e. the components surrounded by the dash-dotted line, one puts the sieve 32 with the ring 321 on the opening rim of the container 2. Then one takes the crushing tool 3 and puts its lower end 310 through the central opening of the sieve 32 to mount the crushing tool on the bearing pin 20 secured in the bottom of the container 2 by the anchor device 27.

The crushing tool 3 of FIG. 2 has a coupling for coupling with a dedicated drive unit. The pieces of crushed ice have a different maximum size due to the different geometry of the openings 322 of the sieve 32.

Figure 3B:
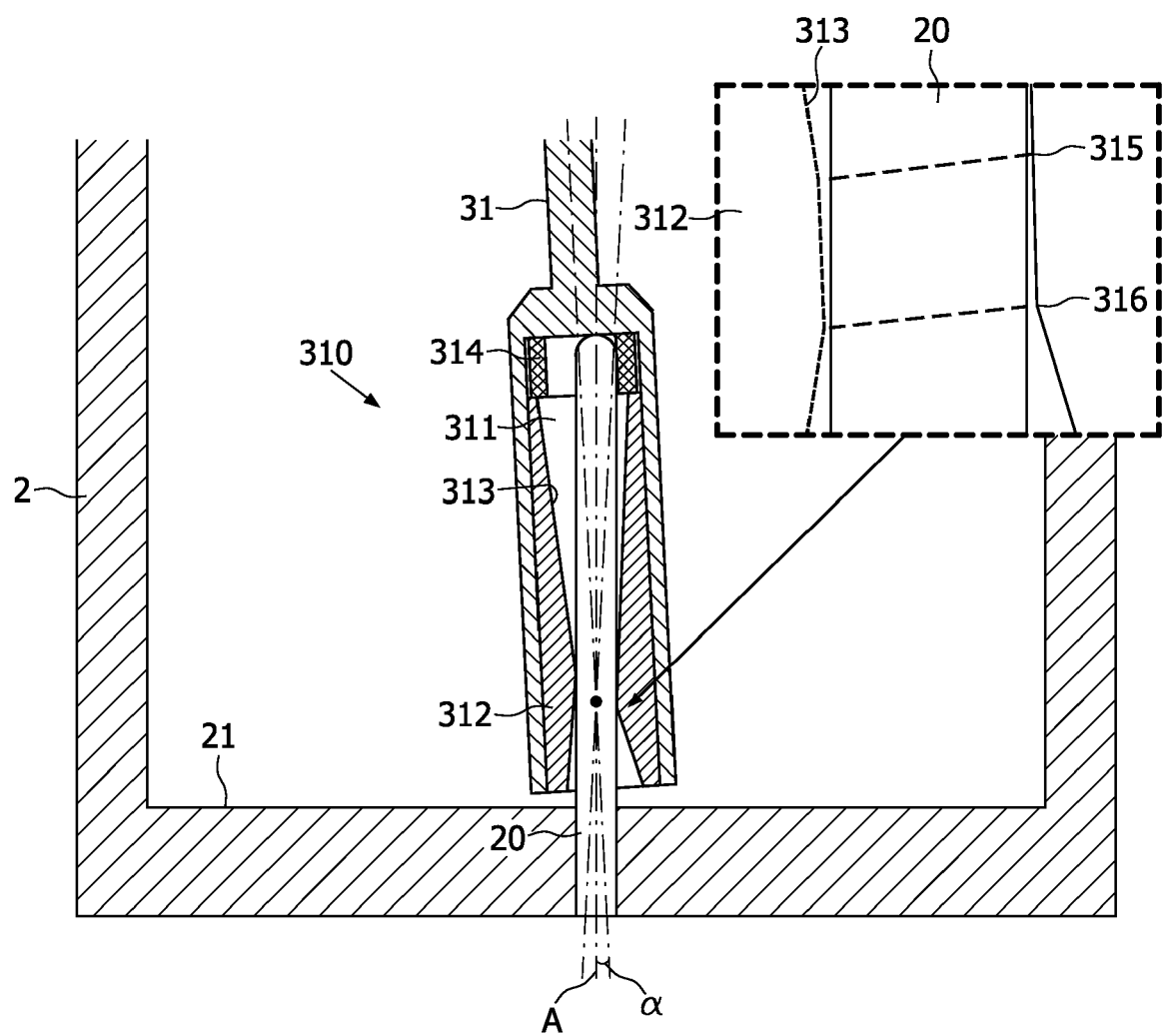

FIGS. 3a,b show more in detail the bearing of the tool spindle 31 on the bearing pin 20 in case the bearing is adapted to allow for pivotal movement. FIG. 3a shows the situation during regular operation, and FIG. 3b shows the situation during pivotal movement with pivotal angle α around axis A of the bearing pin 20.

The inner surface 313 of the bearing part 312 inside the elongated cavity 311 of the lower end 310 of the tool spindle 31 has a shape causing a jamming with the shaft of the bearing pin 20 during pivotal movement. In the example shown in FIGS. 3a,b, the bearing part 312 has an upper edge 315 and a lower edge 316 (see insert in FIG. 3b).

If the rotational movement of the crushing tool 3 is suddenly stopped by lifting a lid from the container opening or removing the drive unit, not only is the crushing tool 3 not driven to rotation any more, but also is a pivotal movement with pivoting angle α around axis A possible. Due to inertia, the crushing tool 3 continues to rotate with very high speed and simultaneously pivots with pivoting angle α. Due to the pivotal movement, the bearing part 312 cants against the bearing pin 20. The bearing pin 20 then gets kind of clamped between the upper edge 315 on the one side and the lower edge 316 on the other side. This leads to a jamming and a stopping of the crushing tool 3 within 1.5 seconds even if the rotational speed was as high as 12000-15000 rpm.

During the pivotal movement, the upper end of the bearing pin 20 hitting against the inner wall of the elongated cavity 311 may cause annoying noise. To dampen this noise, a rubber ring 314 is provided inside the elongated cavity 311 above the bearing part 312. Instead of rubber, any other elastic material may be utilized.

The ice crusher 1 shown in FIG. 4 has in addition to the crushing tool 3 a stirring tool 34. The stirring tool 34 is integrated into the crushing tool 3. If a stirring in the collecting zone 23 is desired, e.g. for preparing a smoothie, the wing-shaped stirring blades 340 are simply inserted into respective slits in the tool spindle. While the crushing tool 3 rotates for crushing ice in the processing zone 22, the stirring blades 340 rotate as well and stir the pieces of crushed ice already in the collecting zone 23.

Another possibility for realizing a stirring tool 34 as part of the crushing tool 3 could be for example to divide the tool spindle 34 in at least an upper part with the crushing blades 30 and a lower part with the stirring blades 340 and the elongated cavity 311 for mounting the crushing tool 3 on the bearing pin 20. The lower part with stirring blades 340 could be exchanged with a lower part without stirring blades 340, if no stirring is needed. A further possibility consists in providing a crushing tool 3 with fixed crushing blades 30 and fixed stirring blades 340 as well as a sieve 32 readily attached to the tool spindle 31.

It will be noted that a stirring tool 34 may be provided in the collecting zone 23 separately from the crushing tool 3 as well.

Although having described several preferred embodiments of the invention, those skilled in the art would appreciate that various changes, alterations, and substitutions can be made without departing from the spirit and concepts of the present invention. The invention is, therefore, claimed in any of its forms or modifications with the proper scope of the appended claims. For example various combinations of the features of the following dependent claims could be made with the features of the independent claim without departing from the scope of the present invention. Furthermore, any reference numerals in the claims shall not be construed as limiting scope.

LIST OF REFERENCE NUMERALS 1 ice crusher
2 container
20 bearing pin
21 bottom
22 processing zone
23 collecting zone
24 handle
25 bottom ring
26 sheath
27 anchor device
3 crushing tool
30 crushing blade
31 tool spindle
310 lower end
311 elongated cavity
312 bearing part
313 inner surface
314 rubber ring
315 upper edge
316 lower edge
32 sieve
320 opening
321 ring
322 opening
33 coupling
34 stirring tool
340 stirring blade
A axis
α pivotal angle
ø diameter of opening 320.

The invention claimed is:

1. A device for chopping food, said device comprising:
a container having an opening edge and a bottom and being divided into an upper processing zone, a transition region, and a lower collecting zone;
a bearing pin positioned on the bottom of the container; and
a tool spindle having a lower end and a rotary cutting blade for forming a chopping tool for reducing the food, said chopping tool being positioned in the upper processing zone; and
a sieve attached to a ring, wherein the ring is mounted on the opening edge of the container, wherein the sieve is in the transition region from the processing zone to the collecting zone for at least partially separating the upper processing zone from the lower collecting zone,
wherein the lower end of the tool spindle is rotatably mounted on the bearing pin.

2. The device according to claim 1, wherein a bottom of the sieve includes an opening to accommodate the tool spindle.

3. The device according to claim 1, wherein the lower end of the tool spindle has an elongated cavity for rotatably engaging with the bearing pin and allowing for pivotal movement about an axis of the bearing pin.

4. The device according to claim 3, wherein the elongated cavity is provided with a bearing part, an inner surface of the bearing part having a predetermined shape for jamming with the bearing pin during pivotal movement.

5. The device of claim 4, wherein the predetermined shape has a first width at a first end, a second width at a second end, and a third width between the first end and the second end; the first width, the second width and the third width being different from each other.

6. The device according to claim 1, wherein the ring comprises elastic material.

7. The device according to claim 1, wherein the bearing pin is made of metal.

8. The device according to claim 1, further comprising a stirring tool in the collecting zone.

9. The device according to claim 8, wherein the stirring tool is part of the chopping tool.

10. The device according to claim 8, wherein the stirring tool is formed by a rotary stirring blade.

11. The device of claim 1, wherein the lower end of the tool spindle has an elongated cavity with a width for rotatably engaging with the bearing pin, the width being variable along the elongated cavity.

12. The device of claim 11, wherein the width decrease from both ends of the elongated cavity toward a middle of the elongated cavity.

13. The device of claim 11, wherein the width is minimum near a lower end of the elongated cavity and increase towards the lower end and an upper end of the elongated cavity.

14. The device of claim 13, wherein the width at the upper end of the elongated cavity is maximum.

15. The device of claim 1, wherein the lower end of the tool spindle has an elongated cavity for rotatably engaging with the bearing pin and allowing for pivotal movement about an axis of the bearing pin for jamming with the bearing pin during pivotal movement.

16. The device of claim 15, wherein the jamming leads to stopping of the crushing tool within substantially 1.5 seconds for a rotational speed of the crushing tool of up to substantially 15000 revolutions per minute.

* * * * *